United States Patent
Bruck et al.

(10) Patent No.: US 7,841,360 B2
(45) Date of Patent: Nov. 30, 2010

(54) VALVE, ESPECIALLY PROPORTIONAL PRESSURE CONTROL VALVE

(75) Inventors: Peter Bruck, Althornbach (DE); Hermann Albert, Lebach (DE)

(73) Assignee: Hydac Fluidtechnik GmbH, Sulzbaach/Saar (DE)

(*) Notice: Subject to any disclaimer, the term of this patent is extended or adjusted under 35 U.S.C. 154(b) by 370 days.

(21) Appl. No.: 11/795,761

(22) PCT Filed: Jan. 25, 2006

(86) PCT No.: PCT/EP2006/000620

§ 371 (c)(1),
(2), (4) Date: Jul. 20, 2007

(87) PCT Pub. No.: WO2006/084576

PCT Pub. Date: Aug. 17, 2006

(65) Prior Publication Data

US 2008/0115848 A1    May 22, 2008

(30) Foreign Application Priority Data

Feb. 11, 2005   (DE) ................... 10 2005 006 321

(51) Int. Cl.
*F16K 11/07* (2006.01)
(52) U.S. Cl. .............. 137/625.68; 137/625.64; 137/493; 251/30.04
(58) Field of Classification Search ............ 137/493, 137/625.6, 625.65, 625.68, 625.64; 251/25, 251/29, 30.01, 30.04, 129.15
See application file for complete search history.

(56) References Cited

U.S. PATENT DOCUMENTS

| | | | | |
|---|---|---|---|---|
| 3,667,722 A * | 6/1972 | Katz et al. | ............ | 251/30.04 |
| 4,316,599 A | 2/1982 | Bouvet et al. | | |
| 4,548,383 A * | 10/1985 | Wolfges | ............ | 251/29 |
| 4,699,351 A * | 10/1987 | Wells | ............ | 251/29 |
| 4,799,645 A * | 1/1989 | Kramer et al. | ............ | 251/30.04 |
| 5,072,752 A * | 12/1991 | Kolchinsky | ............ | 137/493 |
| 5,350,152 A * | 9/1994 | Hutchison et al. | ............ | 251/30.05 |
| 5,366,202 A * | 11/1994 | Lunzman | ............ | 251/30.05 |
| 5,445,188 A * | 8/1995 | Bourkel et al. | ............ | 137/625.64 |
| 5,564,673 A * | 10/1996 | Pieren | ............ | 251/30.03 |
| 5,836,335 A * | 11/1998 | Harms et al. | ............ | 137/14 |

(Continued)

FOREIGN PATENT DOCUMENTS

DE    29 14 196    10/1980

(Continued)

*Primary Examiner*—John K Fristoe, Jr.
(74) *Attorney, Agent, or Firm*—Roylance, Abrams, Berdo & Goodman LLP

(57) ABSTRACT

A proportional pressure control valve includes a valve housing (38) with at least three fluid connections (1, 2, 3). The valve can be connected to a hydraulic drive system with a pre-determinable consumer pressure. The valve can perform reliable valve switching functions even for low-viscous fluid media, and can reduce its susceptibility to disturbance variables. A valve piston (56) actively connected to a pilot seat (5) by an energy accumulator (62) can be controlled by a control device (40). The consumer pressure on a fluid connection (1) acts on the valve piston (56) such that, according to the consumer pressure and the actuating force of the control device (40), a fluid can flow between the two other fluid connections (2 and 3) in both directions inside the valve housing (38).

10 Claims, 3 Drawing Sheets

U.S. PATENT DOCUMENTS

| | | | | |
|---|---|---|---|---|
| 6,073,652 A | * | 6/2000 | Wilke et al. | 137/596.16 |
| 6,904,937 B2 | * | 6/2005 | Fischer | 137/625.64 |
| 7,073,533 B2 | * | 7/2006 | Bruck et al. | 137/625.68 |
| 2004/0195532 A1 | * | 10/2004 | Barber et al. | 251/30.02 |

FOREIGN PATENT DOCUMENTS

| | | |
|---|---|---|
| DE | 43 24 589 | 1/1995 |
| DE | 44 02 580 | 8/1995 |
| DE | 44 23 629 | 1/1996 |
| DE | 103 23 595 | 12/2004 |
| EP | 0 369 412 | 5/1990 |

* cited by examiner

State of the Art

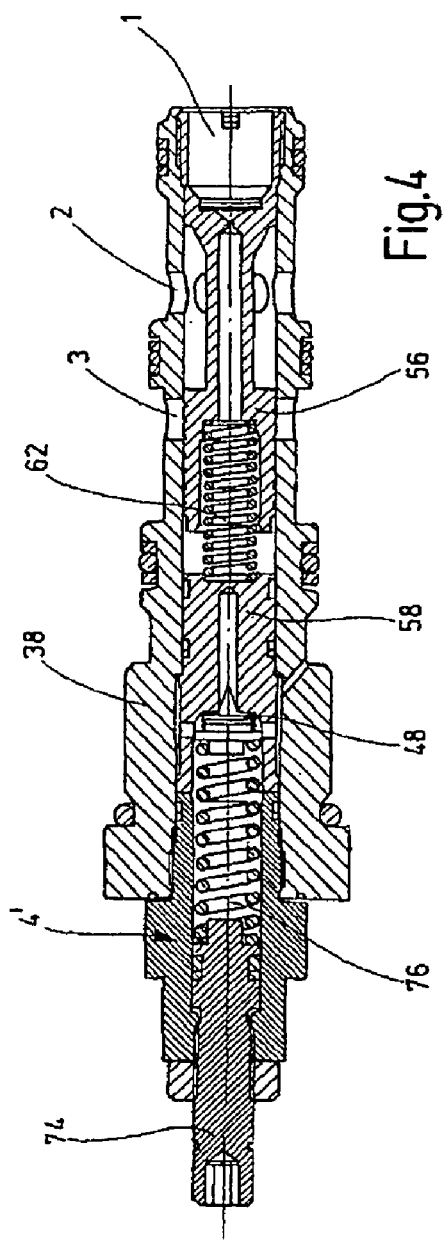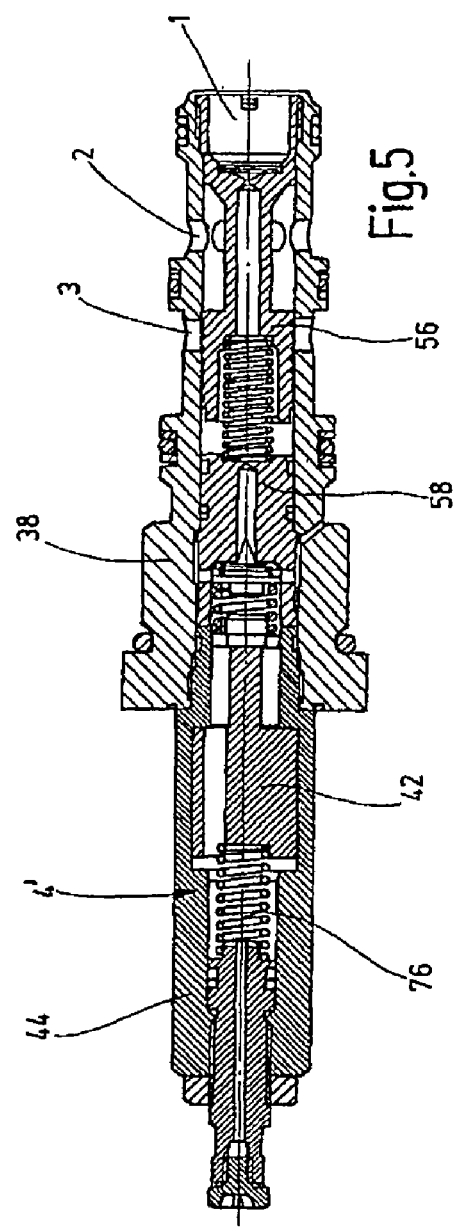

VALVE, ESPECIALLY PROPORTIONAL PRESSURE CONTROL VALVE

FIELD OF THE INVENTION

The present invention relates to a valve, especially a proportional pressure control valve, including a valve housing with at least three fluid ports. The valve is connectable to a hydraulic drive system with a definable consumer pressure.

BACKGROUND OF THE INVENTION

Proportional pressure control valves (such as disclosed in U.S. Pat. No. 4,316,599) are known which among other things form control valves for oil hydraulic systems and deliver an essentially constant output pressure for a variable input pressure. The output pressure to be controlled is dictated by the current signal delivered by the corresponding trigger electronics and acting on the actuating magnet as the magnet system. The actuating magnet can be made as a pressure-tight oil bath magnet and has a long service life.

Proportional pressure control valves such as these can be directly controlled piston sliding valves in a three-way design, i.e., with output side pressure safeguarding. They are used among other things in oil hydraulic systems to control clutches in shift transmissions for controlled influencing of pressure build-up and pressure drop, for remote pressure setting, and for controlling pressure variations and for pilot control of hydraulic valves and logic elements.

These conventional proportional pressure control valves have poor stability especially for thin-liquid fluid media, i.e., they begin to "oscillate". This problem is especially harmful when the known valves are designed to perform special functions, for example, in motor vehicle power steering systems, hydraulic drive units, and other safety engineering-relevant domains. It has generally been found that when pressure control valves are used, susceptibility to fault variables lies in the natural frequency region of the valve. The instabilities occurring can lead to failure of the valve and the pertinent parts of a hydraulic system.

In the prior art, multiaxle drive units for elevating work platforms are known which generally have a rear drive and optional all-wheel drive. To ensure safe operation with driving of only one axle and a free-running of the other axle and execution of braking processes with sudden stopping, in the known solution a plurality of valve components is necessary, such as two shock valves, two counter balance valve combinations. The valve combinations can include one pressure control valve and one 2/2-way valve each, and a 2/2-way valve as the recirculation valve. This functional structure is reliable in operation, but due to the plurality of valves its failure in operation must be expected. This failure shortens maintenance intervals. The known solution also requires a large amount of installation space and is expensive to manufacture due to the diversity of parts.

SUMMARY OF THE INVENTION

An object of the present invention is to provide a valve, especially a proportional pressure control valve, which has good stability when thin-liquid fluid media are used, and which especially when used in safety-relevant domains including hydraulic drive unit helps reduce the diversity of components.

This object is basically achieved by a valve with a control means to trigger a valve piston dynamically connected to a pilot seat by an energy storage device. Because the prevailing consumer pressure at one fluid port acts at least on the valve piston, depending on the prevailing consumer pressure and on the actuating force of the control means, fluid can flow between the two other fluid ports in both directions within the valve housing. The valve is devised which, even for thin-liquid fluid media, can perform reliable valve operating functions. Susceptibility to fault quantities is also reduced. If the valve is used within completely hydraulic systems, such as hydraulic drive units, the shock valves, counter balance valves and directional control valves used in the past can be replaced by a base valve. Essentially the same switching and operating functions can then be implemented with only one valve according to the present invention. This arrangement reduces the production and maintenance costs. Since within the drive unit only one valve need be managed, operating reliability overall is increased.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale:

FIGS. 3 to 5 are side elevational views in section of first, second and third exemplary embodiments, respectively, of proportional pressure control valves according to the present invention, in FIG. 3 the shuttle valve as shown in FIG. 2 being included for the purposes of more detailed explanation.

DETAILED DESCRIPTION OF THE INVENTION

Figure 1:
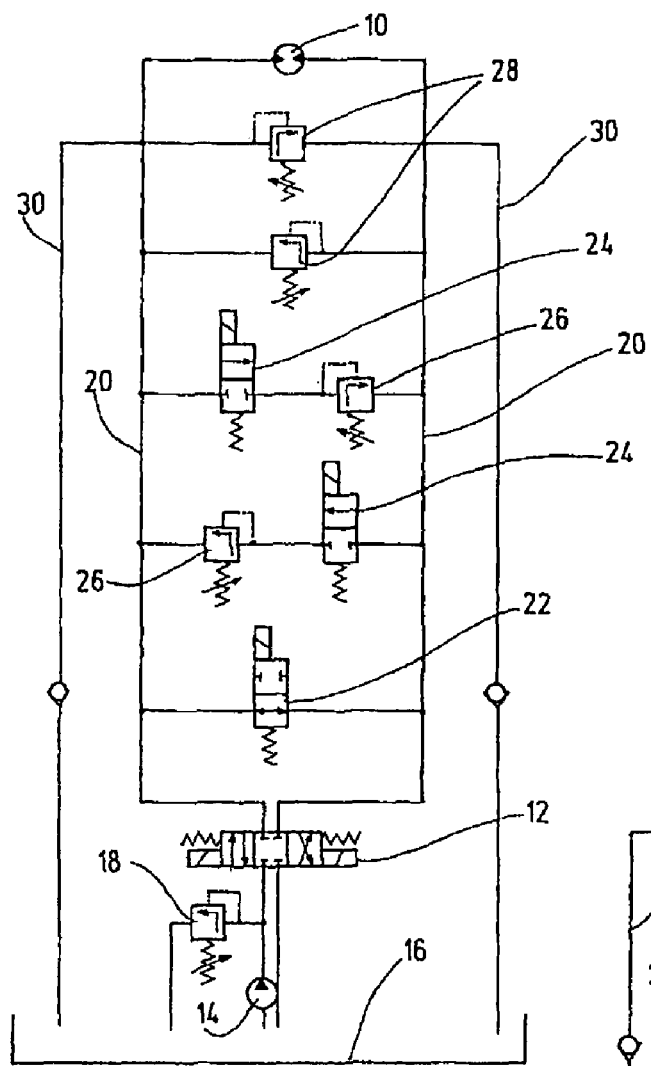
FIG. 1 is a hydraulic circuit diagram, parts of a hydraulic elevating work platform according to the prior art.

FIG. 1 is a circuit diagram part of a hydraulic drive unit for a scissors lift platform. These vehicles generally have two axles. Generally a rear drive is implemented, and the front axle can be separately actuated for implementation of optional all-wheel drive. The drives for the two axles are designed to be essentially the same. FIG. 1 for the prior art shows a hydraulic motor 10 as the driving means for the axle of the pertinent vehicle, which axle is not detailed. Depending on the operating position of the 4/3-way valve 12 in both directions of rotation, the motor can be driven in both directions of rotation for forward or backward operation and for implementing a braking function. The 4/3-way valve 12 according to FIG. 1 is shown in the neutral position, and otherwise is connected on the input side to the hydraulic pump 14 and to a tank 16.

The supply line of the hydraulic pump 14 is safeguarded via a conventional pressure control valve 18. Two parallel running supply lines 20 extend to the respective input sides of the hydraulic motor 10. Between the two supply lines 20, different valves such as a recirculation valve 22, two counter balance valves 24 with each one pressure control valve 26 connected thereto, and two other pressure control valves 28 as shock valves are connected in parallel. In the region of the connection sites of the shock valve 28 located topmost in FIG. 1, two secondary lines 30 are connected oppositely to the two supply lines and lead back to the tank and safeguarded by check valves. These check valves are used as replenishing valves to prevent cavitation. Altogether the known solution has two shock valves 28, two counter balance valves 24 with pressure control valves 26 and one recirculation valve 22, the two counter balance valves 24 and the recirculation valve 22 in the form of 2/2-way valves.

To explain operation of the known drive unit shown in FIG. 1 in greater detail, a typical operating sequence is reproduced below. If, for example, when only one axle (rear drive) is driven, the second axle is entrained in free running, the recirculation valve 22 is switched into its enabling position shown in FIG. 1 so that the oil returning from the hydraulic or traveling motor 10 is routed back to the motor to avoid running dry. In traveling operation with only one drive axle, the 4/3-way valve 12 remains off, so that all the pump oil is routed to the active axle, and the speed is doubled.

If a braking process is to be carried out, the inactive axle can be engaged to support the braking process. To this end, the recirculation valve 22 is blocked, and depending on the braking direction, the other 2/2-valve 24 is switched as a counter balance valve to clear the fluid-carrying path via an additional pressure control valve 26 directly connected to it. Since for this braking possibility in two opposite traveling directions the arrangement shown in FIG. 1 must be doubled, for a pressurizing or braking function there are accordingly twice the number of pressure control valves 26 in addition to the 2/2-valves 24.

If sudden stopping (emergency braking) of the drive unit is to take place by turning off all directional control valves, or unintentionally high external loads on the oil or fluid circuit otherwise occur, fundamentally the pressure in the lines, for example, the supply lines 20, or in the valve housing, could increase such that failure of a component can occur. To counteract this possible failure, in the circuit other pressure control valves 28 as shock valves are installed. When a definable pressure is reached, pressure control valves 28 enable circulation of the fluid or oil in its own circuit. The described functions need never be switched at the same time for reliable operation, and the valve means are present for optional all-wheel drive for each axle to be triggered according to the circuit diagram in FIG. 1.

Figure 2:
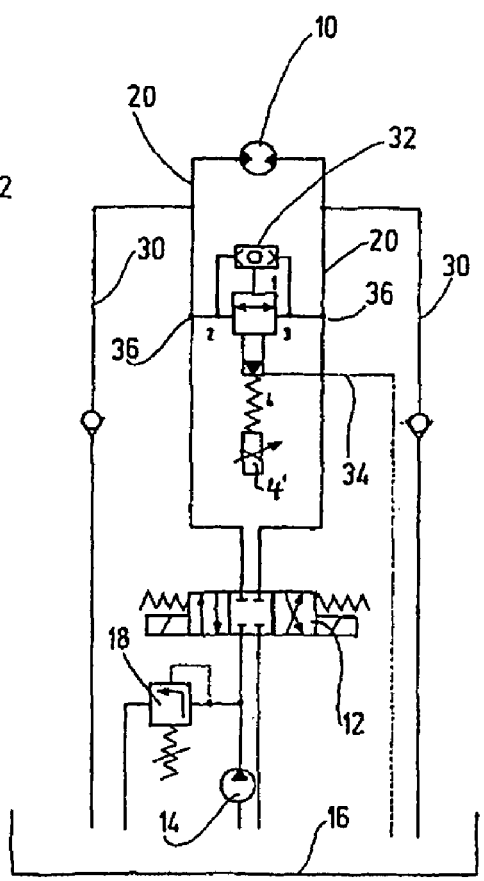
FIG. 2 is a hydraulic circuit according to an exemplary embodiment of the present invention.
Figure 3:
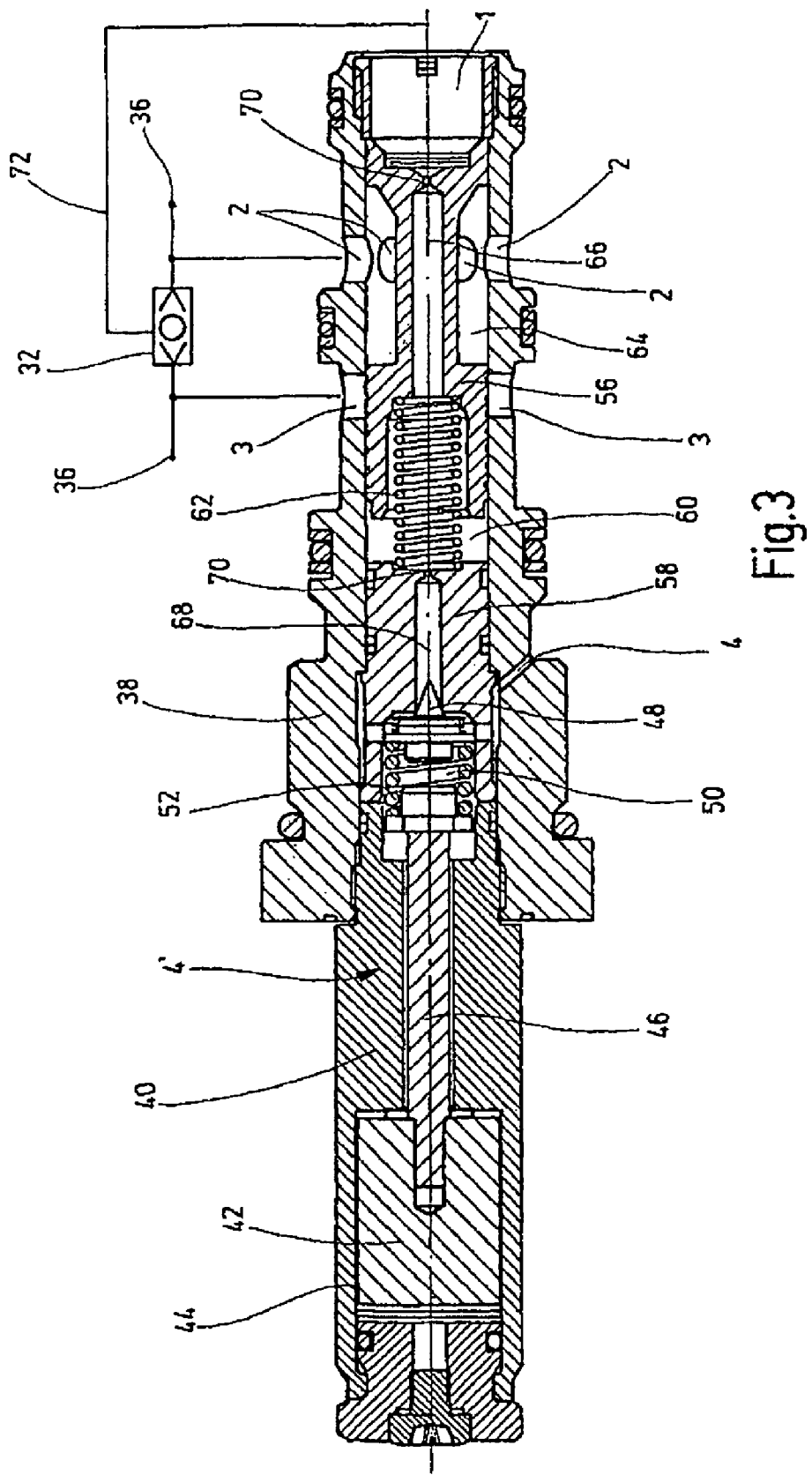

In the altered embodiment as shown in FIG. 2 with the valve according to the present invention, the same components as in FIG. 1 are also labeled with the same reference numbers. The plurality of illustrated individual valves according to the solution as shown in FIG. 1 is replaced in the circuit diagram of FIG. 2 by a valve according to the present invention which interacts with a shuttle valve 32 as another valve. The three independent fluid ports 1, 2, and 3 are indicated, and the control means or valve control of the valve is labeled 4'. Furthermore, the valve has another, fourth fluid port 4 connected to the tank 16 via the connecting line 34 and used for unpressurized diversion of the pilot oil. The valve arrangement with the shuttle valve 32 is switched between the two supply lines 20 via the connection sites 36. The proportional valve used in the circuit diagram of FIG. 2 is shown in particular in different embodiments as illustrated in FIGS. 3 to 5. In the embodiment of FIG. 3 the shuttle valve 32 is shown again by a symbol. The shuttle valve is not shown in FIGS. 4 and 5 for simpler illustration.

Before the function of the hydraulic circuit as shown in FIG. 2 is detailed, first the proportional control valve as shown in FIGS. 3 to 5 will be detailed below.

The valve, especially the proportional pressure control valve shown in FIG. 3, has a valve housing 38 in the mariner of a screw-in cartridge. On the free face end of the valve housing 38 there is one fluid port 1. Along the outer periphery of the valve housing 38, the other fluid ports 2, 3, and 4 penetrate the pertinent valve housing 38 in the radial direction. The individual fluid ports 1, 2, 3 and 4 are accordingly separated fluid-tight from one another by seals located on the outer peripheral side on the valve housing 38. Furthermore, as shown symbolically in FIG. 3, the shuttle valve 32, on its input sides, is connected to the fluid ports 1, 2 and 3 and to the connection sites 36, as shown in FIG. 2, discharging into the supply lines 20 (not shown in FIG. 3).

The valve housing 38, as shown, is made as a screw-in cartridge and can be screwed into the connection unit of the drive unit (not shown) with its all-hydraulic system. On its end opposite the fluid port 1, the valve housing 38 is provided with a control means or valve control 40 made in the manner of a magnet system having a magnet armature 42 energized by a coil (not shown) to move back and forth within a pole tube 44. In moving back and forth, armature 42 triggers a closing part 48 in the form of a closing cone by acting on the actuating rod 46. The closing part 48 and actuating rod 46 are separated from one another via a compression spring 50 as an energy storage device. Both the closing part 48 and the compression spring 50, as well as the front end of the actuating rod 46 facing away from the magnet armature 42, are guided in a fluid space 52 which can be connected to carry fluid via the fluid port 4 to the connecting line 34 as shown in FIG. 2, which discharges with its free end into the tank 16.

Within the valve housing 38, a valve piston 56 is guided and is made in the manner of a primary stage. The component 58 constitutes the pilot seat of the valve in the manner of a pre-stage. The valve piston 56 has one face end bordering another fluid space 60 receiving another energy storage device in the form of a compression spring 62 which engages a hollow-cylindrical recess in the valve piston 56. The valve piston 56 is furthermore provided on the outer peripheral side with a radial recess 64 having an axial length, viewed in the lengthwise direction of the valve, dimensioned such that in definable switching or displacement positions of the valve piston 56 a fluid-carrying path between the fluid ports 2 and 3 is partially cleared, and, as shown in FIG. 3, can be blocked. Both the valve piston 56 and the pilot seat 58 have fluid channels 66, 68 which pass in the lengthwise direction and which viewed in the direction of FIG. 3 on their right end have one orifice 70 each which choke the fluid flow present on the fluid port 1.

Flow through the proportional valve shown in FIG. 3 can take place in both directions, that is, from fluid port 2 to fluid port 3 or vice versa. The direction of the throughflow is among other things determined by where the highest consumer pressure prevails in the supply lines 20. This consumer pressure is reported by the shuttle valve 32 via a signaling line 72 to the fluid port 1 of the proportional valve. If the closing pressure which can be set by the magnet system of the control means or valve control 4' is exceeded by the consumer pressure prevailing on the fluid connection 1 to raise the closing part 48 off the pilot seat 58 as the pre-stage, the pilot control opens in this way, and the valve piston 56 designed as the primary stage moves against the force of the energy storage device in the form of a compression spring 62 to the left. In this way the fluid-carrying connection is opened from fluid port 2 to fluid port 3, and fluid (oil) can flow from the higher to the lower pressure level. In the de-energized state, that is, when the magnet system has not been activated, the proportional valve meets the requirement for unpressurized oil circulation of one axle (axle free running), for which in the past an additional 2/2-way valve 22 (cf. FIG. 1) was necessary according to the prior art.

For partially energized setting of the magnet system and therefore partial activation of the magnet armature 42, with the valve according to the present invention the function of the pressurizing is implemented in which the hydraulic motor 10 can be braked by a defined pressure. With the solution according to the present invention, the brake action can be proportionally set via the magnetic force of the magnet system. This valve function then replaces the existing combination of the pressure control valve 26 with the 2/2-way valve 24 as the overall pressurizing system (cf. FIG. 1). For complete energization and therefore the highest magnet closing force, the proportional valve according to the present invention performs the function of the previously known shock valves 28 as independent pressure control valves. Another advantage of the solution according to the present invention is that the reference of the proportional valve can be placed against the pressure in the tank 16 so that the pressures on the outflow side can no longer be added to the set pressure.

The altered embodiments as, shown in FIGS. 4 and 5 will be explained in that they differ essentially from the valve solution as shown in FIG. 3. In terms of their actual valve structure, the three designs as shown in FIGS. 3 to 5 correspond to one another and the essential differences can be seen only in the scope of execution of the respective control means or valve control 4'.

In the embodiment as shown in FIG. 4, the magnet system 4' is replaced by mechanical presetting with which via a spindle 74. The force of spring 76 the closing pressure for the closing part 48 can be dictated or set by hand. The valve is made as a double-acting, pilot-controlled shock valve with tank reference via the connecting line 34. The double action is based on the decoupling of the control port 1 from the consumer ports 3 and 4. This valve version is both defined (black/white—switching behavior) and can also be proportionally triggered.

While the embodiment as shown in FIG. 3 has a pushing magnet system in which in the energized state the magnet armature 42 seeks to keeps the closing part 48 in its closed position to block the channel 68 via the actuating rod 46, in the solution as shown in FIG. 5 the magnetic system with the magnet armature 42 is made as a pulling system in which the magnet armature 42 under the influence of an energized winding coil (not shown) viewed in the direction of FIG. 5 moves from right to left against the action of the force spring 76 as part of mechanical presetting according to the solution shown in FIG. 4. The embodiment shown in FIG. 5 therefore combines a pulling magnetic system with mechanical presetting according to the solution shown in FIG. 4. If the assignable pole tube 44 is made as a fail-safe pole tube, this enables other versions. Thus, at full energization unpressurized circulation is enabled and in the de-energized state of the magnetic system as the switching means 4' there would be a type of fail-safe valve with the function of a double-acting, pilot controlled shock valve with a tank reference. The maximum pressure can then be manually set, similarly to as in a normal pressure control valve. This de-energized state is shown in this way in FIG. 5.

If the proportional drive according to the present invention is used in the described hydraulic vehicle drive, a clear reduction of the number of required valves is possible, and altogether the installation space for the valve design is reduced. Since flow takes place through the proportional valve according to the present invention in both directions, twice the number of valves according to the known solution as shown in FIG. 1 is eliminated. On the basis of the consideration that no two functions need proceed at the same time, in this way alternative switching of the proportional valve according to the hydraulic switching design as shown in FIG. 2 can be used and thus a plurality of valves can be saved, which helps to reduce production and maintenance costs overall. The proportional valve, however, need not be limited to the use of vehicle drives, but can also be used in other hydraulic circuits based on its stable switching behavior, especially wherever increased safety requirements are emphasized.

While various embodiments have been chosen to illustrate the invention, it will be understood by those skilled in the art that various changes and modifications can be made therein without departing from the scope of the invention as defined in the appended claims.

What is claimed is:

1. A proportional pressure control valve, comprising:
   a housing with first, second and third ports extending independently therein from an outside surface of said housing and connectable to a hydraulic drive system with a definable consumer pressure;
   a valve piston movably mounted in said housing controlling connection of said second and third ports by varying positions thereof and exposed to and acted on by prevailing consumer pressure at said first port on a first end thereof;
   a pilot seat in said housing and dynamically connected to said valve piston by an energy storage device on a second end of said valve piston, said first and second ends being opposite, said valve piston and said pilot seat including a piston connecting channel and a seat connecting channel, respectively, extending therethrough and having a choke orifice on an end of each thereof facing said first port; and
   valve control triggering said valve piston and acting on said valve piston, said seat, connecting channel being closable by a conical closing part of said valve control;
   depending on the prevailing consumer pressure and an actuating force of said valve control said valve piston is set in a position allowing fluid flow between said second and third ports in both directions through said valve housing.

2. A proportional pressure control valve according to claim 1 wherein
   a shuttle valve is connected between said second and third ports, and is connected to said first port by a signaling line to supply a highest consumer pressure on said first port.

3. A proportional pressure control valve according to claim 1 wherein
   said first port discharges on a front side thereof into a free end of said valve housing; and
   said second and third ports penetrate an outer side periphery of said valve housing and are connectable in fluid communication by said valve piston as a primary stage depending on positioning of said valve piston in said valve housing.

4. A proportional pressure control valve according to claim 3 wherein
   said pilot seat acts as a pre-stage and is exposable to a definable force by said valve control.

5. A proportional pressure control valve according to claim 1 wherein
   said energy storage device comprises a compression spring between said valve piston and said pilot seat.

6. A proportional pressure control valve according to claim 1 wherein
   said valve piston and said pilot seat are biased apart at a distance by said energy storage device and a fluid space therebetween.

7. A proportional pressure control valve according to claim 1 wherein said valve control comprises a magnet system with a triggerable magnet armature acting on said valve piston and said pilot seat.

8. A proportional pressure control valve according to claim 7 wherein said valve control comprises a mechanical presetting device.

9. A proportional pressure control valve according to claim 1 wherein said valve control comprises a mechanical presetting device.

10. A proportional pressure control valve according to claim 1 wherein a fourth fluid port is provided in said housing and diverts pilot oil unpressurized.

* * * * *